United States Patent
DeCamp

(10) Patent No.: US 9,900,420 B2
(45) Date of Patent: *Feb. 20, 2018

(54) POWER AND DATA ADAPTER

(71) Applicant: Targus International LLC, Anaheim, CA (US)

(72) Inventor: Ronald DeCamp, Long Beach, CA (US)

(73) Assignee: TARGUS INTERNATIONAL LLC, Anaheim, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,318

(22) Filed: Dec. 15, 2015

(65) Prior Publication Data

US 2016/0173678 A1    Jun. 16, 2016

Related U.S. Application Data

(60) Provisional application No. 62/092,033, filed on Dec. 15, 2014.

(51) Int. Cl.
*H04B 1/38* (2015.01)
*H04M 1/725* (2006.01)
(Continued)

(52) U.S. Cl.
CPC ....... *H04M 1/72527* (2013.01); *H02J 7/0044* (2013.01); *H04M 1/04* (2013.01)

(58) Field of Classification Search
CPC .......... G06F 1/1632; G06F 1/26; G06F 1/266; H02J 2007/0062; H02J 4/00; H02J 7/0027;
(Continued)

(56) References Cited

U.S. PATENT DOCUMENTS 5,835,733 A    11/1998  Walsh et al.
5,886,424 A     3/1999  Kim
(Continued)

FOREIGN PATENT DOCUMENTS

AU    2014100171 A4    3/2014
CN    101893916 A     11/2010
(Continued)

OTHER PUBLICATIONS

International Search Report and Written Opinion for PCT/US2015/065730 filed Dec. 15, 2015, and mailed from the International Searching Authority dated Apr. 6, 2016, 16 pgs.

(Continued)

*Primary Examiner* — MD Talukder
(74) *Attorney, Agent, or Firm* — Stoel Rives LLP

(57) ABSTRACT

Adapters, electrical systems, and related methods are disclosed. An adapter includes a universal non-proprietary data and power interface configured to communicatively couple with a docking station, a power output configured to operably couple to a portable communication device, a data interface separate from the power output and configured to communicatively couple with the portable electronic device, and control circuitry. A method includes receiving electrical power and data form a docking station at a universal non-proprietary data and power interface, transmitting power to a portable electronic device through a power output, and relaying data between the portable electronic device and the docking station through a data interface separate from the power output. An electrical system includes an adapter.

20 Claims, 3 Drawing Sheets

(51) Int. Cl.
*H02J 7/00* (2006.01)
*H04M 1/04* (2006.01)

(58) Field of Classification Search
CPC ...... H02J 7/025; H02J 7/0044; H04B 1/3827; H04M 1/72527; H04M 1/04; Y10T 307/25
USPC .............................. 455/557, 41.1, 41.2, 41.3
See application file for complete search history.

(56) References Cited

U.S. PATENT DOCUMENTS

| | | | |
|---|---|---|---|
| 6,170,026 | B1 | 1/2001 | Kimura et al. |
| 6,604,199 | B1 | 8/2003 | Yang et al. |
| 6,976,885 | B2 | 12/2005 | Lord |
| 7,035,126 | B1 | 4/2006 | Lanni |
| 7,103,760 | B1 | 9/2006 | Billington et al. |
| 7,201,611 | B2 | 4/2007 | Faranda |
| 7,643,283 | B2 | 1/2010 | Jubelirer et al. |
| 7,683,573 | B2 | 3/2010 | Nikazm et al. |
| 7,899,970 | B2 | 3/2011 | Mori |
| 7,976,337 | B1 | 7/2011 | Cortopassi et al. |
| 8,990,469 | B2 | 3/2015 | Benhard et al. |
| 2002/0119800 | A1 | 8/2002 | Jaggers et al. |
| 2003/0084222 | A1 | 5/2003 | Wurzburg |
| 2003/0107566 | A1 | 6/2003 | Shin et al. |
| 2004/0064621 | A1 | 4/2004 | Dougherty et al. |
| 2004/0088465 | A1 | 5/2004 | Bianchi |
| 2004/0095713 | A1 | 5/2004 | Chuang |
| 2004/0116149 | A1 | 6/2004 | Yukie et al. |
| 2004/0212586 | A1 | 10/2004 | Denny, III |
| 2005/0162824 | A1 | 7/2005 | Thompson |
| 2005/0164545 | A1 | 7/2005 | Rosenthal et al. |
| 2005/0180086 | A1 | 8/2005 | Schaefer et al. |
| 2006/0005055 | A1 | 1/2006 | Potega |
| 2006/0075286 | A1 | 4/2006 | Hodge et al. |
| 2006/0095641 | A1 | 5/2006 | Pandit et al. |
| 2006/0161713 | A1 | 7/2006 | Belady |
| 2006/0205381 | A1 | 9/2006 | Beart et al. |
| 2006/0250764 | A1 | 11/2006 | Howarth et al. |
| 2007/0070598 | A1 | 3/2007 | Chuang |
| 2007/0101039 | A1 | 5/2007 | Rutledge et al. |
| 2007/0168593 | A1 | 7/2007 | Montag et al. |
| 2008/0053770 | A1 | 3/2008 | Tynyk |
| 2008/0119241 | A1 | 5/2008 | Dorogusker et al. |
| 2008/0126594 | A1 | 5/2008 | Monks et al. |
| 2008/0194119 | A1 | 8/2008 | Mori |
| 2008/0239681 | A1 | 10/2008 | Iida |
| 2009/0058359 | A1 | 3/2009 | Fischer et al. |
| 2009/0066704 | A1* | 3/2009 | Daniel ...................... G06F 3/14 345/501 |
| 2009/0072782 | A1 | 3/2009 | Randall |
| 2009/0079264 | A1 | 3/2009 | Minami |
| 2009/0158423 | A1 | 6/2009 | Orlassino et al. |
| 2009/0177906 | A1* | 7/2009 | Paniagua, Jr. ............ G06F 1/26 713/340 |
| 2009/0228614 | A1* | 9/2009 | Hwang ............. H04M 1/72527 710/16 |
| 2009/0309748 | A1 | 12/2009 | Elgort et al. |
| 2010/0066685 | A1 | 3/2010 | Cain et al. |
| 2010/0081473 | A1 | 4/2010 | Chatterjee et al. |
| 2010/0128766 | A1 | 5/2010 | Sugita |
| 2010/0188808 | A1 | 7/2010 | Howarth et al. |
| 2010/0251361 | A1* | 9/2010 | Collopy ................ G06F 1/1616 726/19 |
| 2010/0259213 | A1 | 10/2010 | Maharaj |
| 2010/0295384 | A1 | 11/2010 | Kobayashi |
| 2011/0145466 | A1 | 6/2011 | Supran et al. |
| 2011/0179291 | A1* | 7/2011 | Weng ........................ G06F 1/26 713/300 |
| 2011/0204843 | A1 | 8/2011 | Foster |
| 2011/0208980 | A1 | 8/2011 | Brooks et al. |
| 2011/0239008 | A1* | 9/2011 | Lam ..................... G06F 13/409 713/300 |
| 2011/0266997 | A1 | 11/2011 | Krancher et al. |
| 2012/0034951 | A1 | 2/2012 | Jones, III et al. |
| 2012/0054400 | A1 | 3/2012 | Iverson et al. |
| 2012/0068538 | A1 | 3/2012 | Ye et al. |
| 2012/0081087 | A1* | 4/2012 | Ching-Wei ............. G06F 1/266 323/282 |
| 2012/0155013 | A1 | 6/2012 | Huang |
| 2013/0205060 | A1* | 8/2013 | Benhard ............... G06F 1/1632 710/303 |
| 2014/0181350 | A1 | 6/2014 | Pedro et al. |
| 2014/0208134 | A1 | 7/2014 | Waters et al. |
| 2014/0244869 | A1 | 8/2014 | Adrian et al. |
| 2014/0301575 | A1 | 10/2014 | Holtman et al. |
| 2014/0342669 | A1 | 11/2014 | Zeung et al. |
| 2014/0359318 | A1* | 12/2014 | Liu ........................... G06F 1/26 713/300 |
| 2015/0082061 | A1* | 3/2015 | Ramirez ............... G06F 1/1632 713/323 |
| 2015/0106814 | A1 | 4/2015 | Vilke et al. |
| 2015/0237191 | A1* | 8/2015 | Moran .............. H04M 1/72527 455/556.1 |
| 2015/0295440 | A1* | 10/2015 | Liao ...................... H02J 7/0045 320/103 |
| 2015/0346792 | A1* | 12/2015 | Rathi ...................... G06F 1/266 713/310 |
| 2015/0356045 | A1 | 12/2015 | Soffer |
| 2016/0173678 | A1* | 6/2016 | DeCamp ................ H02J 7/0044 455/557 |
| 2016/0187963 | A1* | 6/2016 | Leinonen ............. H04L 12/6418 710/313 |

FOREIGN PATENT DOCUMENTS

| | | | |
|---|---|---|---|
| GB | WO2005003983 | * | 1/2005 |
| GB | 2 457 252 A | | 8/2009 |
| WO | WO 03/030304 A2 | | 4/2003 |
| WO | WO 2008/109193 A1 | | 9/2008 |
| WO | WO 2013/033573 A2 | | 3/2013 |

OTHER PUBLICATIONS

International Search Report and Written Opinion for PCT/US2012/023717 filed Feb. 3, 2012, and dated Aug. 30, 2012, 9 pgs.
International Preliminary Report on Patentability for PCT/US2012/023717 filed Feb. 3, 2012, and dated Aug. 15, 2013, 6 pgs.
Non-Final Office Action for U.S. Appl. No. 13/365,754, filed Feb. 3, 2012, and mailed from the USPTO dated Sep. 10, 2013, 15 pgs.
Fink, Thomas, "Toshiba Dynadock V Review," Aug. 9, 2010, Laptop Magazine, retrieved from the Internet on Dec. 21, 2013, at <http://www.laptopmag.com/review/accessories/toshiba-dynadock-v.aspx>, pp. 1-2.
Final Office Action for U.S. Appl. No. 13/365,754, filed Feb. 3, 2012, and mailed from the USPTO dated Dec. 27, 2013, 18 pgs.
Non-Final Office Action for U.S. Appl. No. 13/365,754, filed Feb. 3, 2012, and mailed from the USPTO dated May 13, 2014, 18 pgs.
Final Office Action for U.S. Appl. No. 13/365,754, filed Feb. 3, 2012, and mailed from the USPTO dated Jun. 10, 2014, 22 pgs.
International Search Report and Written Opinion for PCT/US2014/017434 filed Feb. 20, 2014, and mailed from International Searching Authority dated Jun. 30, 2014, 13 pgs.
Non-Final Office Action for U.S. Appl. No. 13/365,754, filed Feb. 3, 2012, and mailed from the USPTO dated Sep. 17, 2014, 25 pgs.
Non-Final Office Action for U.S. Appl. No. 13/786,038, filed Mar. 5, 2013 and mailed from USPTO dated Sep. 18, 2014, 24 pgs.
Notice of Allowance and Fee(s) Due for U.S. Appl. No. 13/365,754, filed Feb. 3, 2012, and mailed from the USPTO dated Feb. 4, 2015, 8 pgs.
International Preliminary Report on Patentability for PCT/US2014/017434 filed Feb. 20, 2014, and mailed from the International Bureau dated Sep. 17, 2015, 10 pgs.
Non-Final Office Action for U.S. Appl. No. 14/634,196, filed Feb. 27, 2015, and mailed from USPTO dated Sep. 7, 2016, 25 pgs.
Non-Final Office Action for U.S. Appl. No. 14/923,833, filed Oct. 27, 2015, and mailed from the USPTO dated Nov. 1, 2016, 14 pgs.

(56) References Cited

OTHER PUBLICATIONS

International Preliminary Report on Patentability for Application No. PCT/US2015/065730 filed Dec. 15, 2015, and mailed from the International Bureau dated Apr. 6, 2016, 13 pgs.
Non-Final Office Action for U.S. Appl. No. 14/923,833, filed Oct. 27, 2015, and mailed from the USPTO dated Mar. 2, 2017, 22 pgs.
Final Office Action dated Aug. 9, 2017 in U.S. Appl. No. 14/923,833.

* cited by examiner

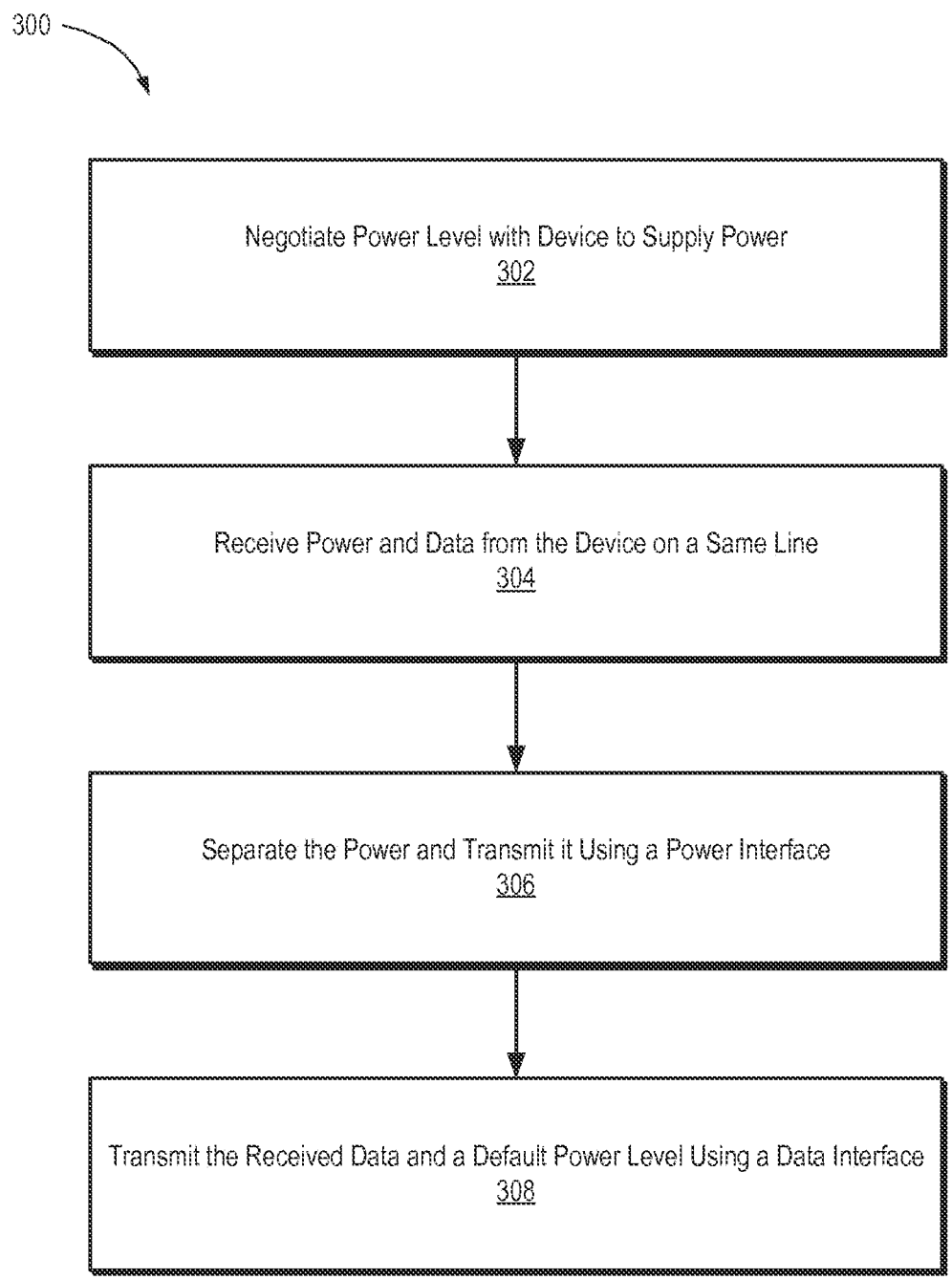

POWER AND DATA ADAPTER

RELATED APPLICATIONS

This utility application claims priority to U.S. Provisional Application 62/092,033, entitled "POWER AND DATA ADAPTER," filed on Dec. 15, 2014, the entire disclosure of which is hereby incorporated herein by this reference.

TECHNICAL FIELD

This disclosure generally relates to electrical adapters. Specifically, this disclosure provides an adapter for separating a data interface with a power output to create a data interface and a separate power output.

BRIEF SUMMARY

Disclosed in some embodiments herein is an adapter including a universal non-proprietary data and power interface. The universal non-proprietary data and power interface is configured to communicatively couple with a docking station, and is configured to operate according to a universal data communication standard to enable bi-direction data communication. The universal non-proprietary data and power interface is also configured to operate according to a universal power communication standard. The adapter also includes a power output configured to operably couple to a portable communication device. The adapter further includes a data interface separate from the power output and configured to communicatively couple with the portable electronic device. The adapter also includes control circuitry in communication with the universal non-proprietary data and power interface, the power output, and the data interface. The control circuitry is configured to relay data communications between the docking station and the portable electronic device through the universal non-proprietary data and power interface and the data interface. The control circuitry is also configured to provide electrical power to the portable electronic device through the power output.

Disclosed in some embodiments herein is a method of providing a universal non-proprietary data and power interface. The method also includes receiving electrical power and data from a docking station at a universal non-proprietary data and power interface configured to operate according to a universal power standard and a universal data communication standard to enable bi-directional data communication. The method also includes transmitting power to a portable electronic device through a power output. The method further includes relaying data between the portable electronic device and the docking station through a data interface separate from the power output.

Disclosed in some embodiments herein is an electrical system including an adapter. The adapter includes a universal non-proprietary data and power interface configured to receive electrical power from a docking station and enable bi-directional data communication between the docking station and a portable electronic device. The universal non-proprietary data and power interface is also configured to operate according to a universal data communication standard to enable the bi-directional data communication. The universal non-proprietary data and power interface is further configured to operate according to a universal power communication standard. The adapter also includes a data interface configured to communicatively couple to the portable electronic device and transmit and receive data from and to the portable electronic device. The adapter further includes a power output separate from the data interface and configured to communicatively couple with the portable electronic device. The adapter also includes control circuitry including a power delivery (PD) logic block communicatively coupled to the data interface and the universal non-proprietary data and power interface. The power delivery block is configured to negotiate, with the docking station, a power level of power to receive from the docking station through the universal non-proprietary data and power interface. The control circuitry also includes a PD voltage decision and output block communicatively coupled to the power output, the PD logic block, and the universal non-proprietary data and power interface. The PD power conversion block is configured to deliver the electrical power to the portable electronic device through the power output at the power level negotiated by the PD logic block.

BRIEF DESCRIPTION OF THE DRAWINGS

FIG. 3 is a flow diagram of a method for separating a data interface with power delivery to create a data interface and a discrete power output.

DETAILED DESCRIPTION

Figure 1:
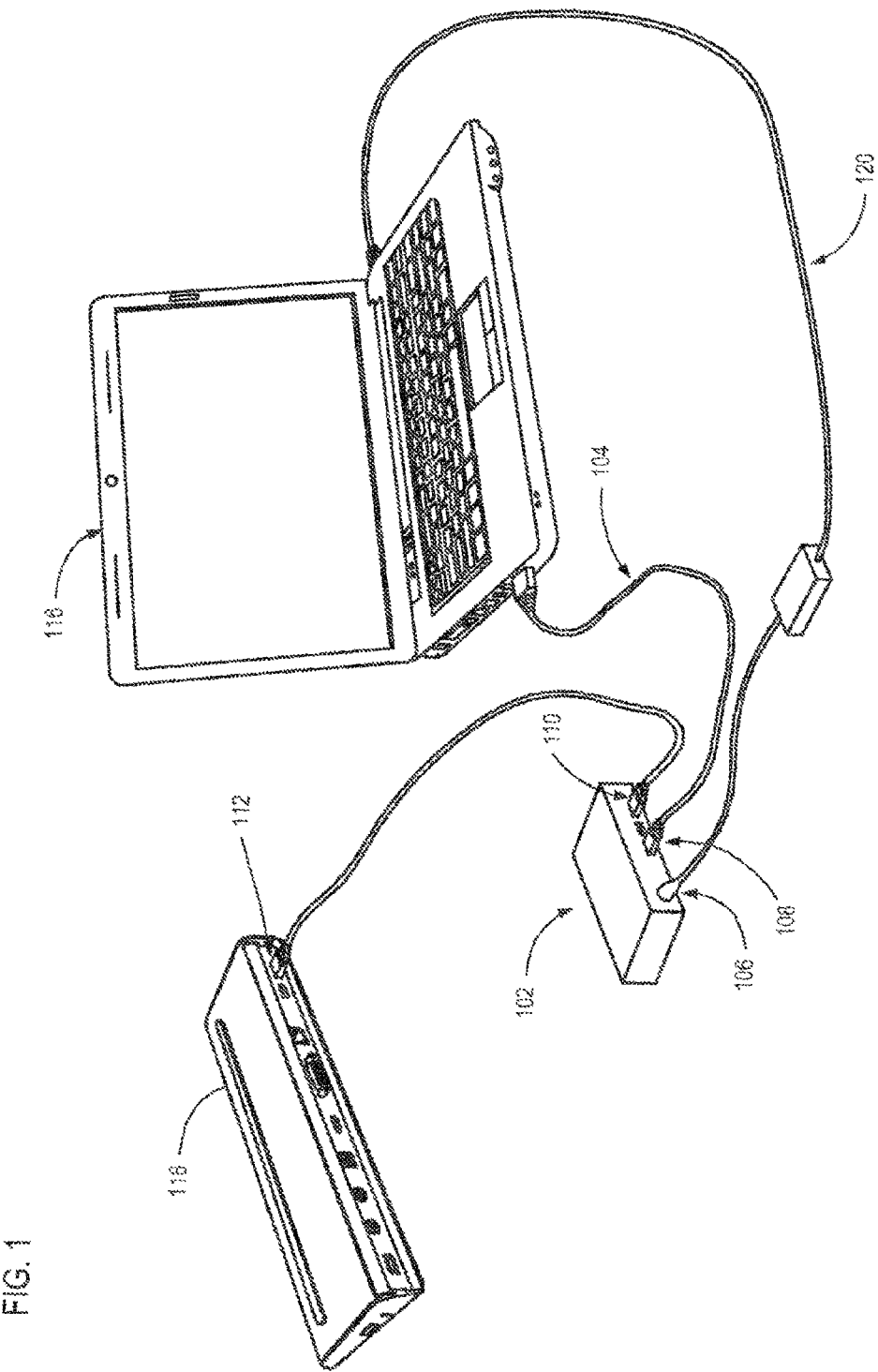
FIG. 1 is a perspective view of an adapter separating a docking station's data interface with power delivery, and thereby providing a remote device with a data interface and a discrete power output.

An adapter may separate a data interface with power delivery ("PD") to create a data interface without PD and a power output. For example, an adapter may include a body with three different interfaces. A first interface may include a data interface with PD configured to communicatively couple a first remote device to the adapter and to receive electrical power from the first remote device. A second interface may include a second data interface configured to communicatively couple a second remote device to the adapter. The second interface may not transfer power and/or may only be able to transfer a default or minimal amount of power. As used herein, an interface without PD includes interfaces only able to transfer a default or minimal amount of power. A third interface may include a power output.

The interfaces may include ports or data/power cables and may be connected to one another within the adapter. The adapter may include one or more PD logic blocks or switches configured to negotiate, via the data interface with PD, with an attached remote device on a suitable electrical power level to receive from the attached remote device. The adapter may also include one or more PD power conversion block(s) that couple the power output and the data interface with PD. In such an embodiment, the PD power conversion block(s) may receive electrical power from the data interface with PD and convert to a predetermined electrical power level to be provided by the power output. In alternate embodiments, the power level to be output may be determined dynamically rather than being predetermined. In addition, the adapter may pass electrical communications between the data interface with PD and the second data interface. For example, as will be discussed in more detail below, the PD logic block(s) may communicatively couple the data interface with PD and the second data interface and transparently pass electrical communication between the interfaces. In some embodiments, the first and second remote devices may transmit and receive electrical communications as if the adapter was not present. The PD logic block(s) may also provide electrical communications to the data interface with PD for negotiating the power level to be received. In some embodiments, it may appear to the first remote device that it is negotiating with the second remote device over the power level to be received. The electrical communications to and from the first remote device and the electric power provided to the PD conversion block(s) may be combined onto a single port and/or cable. The adapter may separate the data and power received via the single port and/or cable for delivery to the second data interface and the power output respectively. Thus, the power and data may be delivered to the second remote device via separate cables due to the capabilities of the second remote device despite the power and data being received via a single cable.

Embodiments of the present disclosure provide and describe an adapter for separating a universal data interface with PD to provide a universal data interface and a power output. As used herein the term "universal" is given to mean usable by more than one platform. For example, a docking station, port, protocol, or interface that is used by a variety of brands of devices, a variety of types of devices, or for a variety of purposes may be referred to as a universal docking station, port, protocol, or interface.

In certain embodiments, the adapter may utilize a single or multiple universal data interface(s), tethered or untethered, to communicatively couple one remote device to another remote device (e.g., a docking station and a computer). In some embodiments, the universal data interface may be a high-speed and/or super-speed universal data interface (e.g., USB 3.0, PCIe, PCI, SATA, eSATA, FireWire, DisplayPort™, Thunderbolt, Lightningbolt) or the like. In one embodiment, the universal data interface may include a WiGig, Bluetooth, WiFi, WiDi, Tri-Band, NFC, WiFi Direct, AirPlay™, or other wireless radio technologies. A universal data interface with PD may be any universal interface discussed above with the added capability of delivering variable or fixed voltage/amperes/wattage power to a remote device (e.g., a Universal Serial Bus (USB) with PD).

The electrical power and communication may be provided in either a wired or wireless manner. For example, electrical power may be provided via a wire, cable, or other conduction point or may be provided via a radiating coil, antenna, or other wireless power coupling which induces or emits electromagnetic waves which can induce a flow of electricity in a corresponding receiving coil, antenna, or other wireless power coupling of a portable electronic device. One of skill in the art will recognize numerous methods for providing power or communicating without direct contact between devices, whether within a fixed or variable distance between devices.

Embodiments may be best understood by reference to the drawing(s), wherein like parts are designated by like numerals throughout. It will be readily understood that the components of the present disclosure, as generally described and illustrated in the drawing(s) herein, could be arranged and designed in a wide variety of different configurations. Thus, the following more detailed description of the embodiments of the systems, methods and apparatuses is not intended to limit the scope of the disclosure, but is merely representative of possible embodiments of the disclosure. In some cases, well-known structures, materials, or operations are not shown or described in detail.

FIG. 1 is a perspective view of an adapter 102 separating a docking station's data interface with power delivery 112, and thereby providing a remote device 116 with a data interface 108 and a separate power output 106. Power delivery enables a device to deliver or receive large amounts of power (e.g., more than a default or minimal power level) through a data interface. The docking station may only require a single cable to provide power and data and may provide sufficient power to charge the remote device over a traditional power cable 120. The remote device 116 may include, for example, a laptop, tablet, phablet, smartphone, desktop computer, monitor, speakers, etc. The adapter's interfaces 106, 108, 110 (i.e., power output and data interfaces) may be either a port, as shown, or cables. For example, in certain embodiments, the data interfaces 108, 110 may be USB ports, while in other embodiments, one or both of the data interfaces 108, 110 may be an internally connected USB cable with a USB connector for connecting directly to the USB ports on remote devices.

The docking station's data interface 112 may be capable of providing power sufficient to charge the remote device 116; however the remote device 116 may not be able to receive the power via a data interface. For example, as illustrated the docking station 118 may provide for a USB interface with PD, and the remote device 116 may not be capable of receiving a USB with PD. In such an example, the standard USB port on the remote device 116 may be capable of receiving around 5 volts and have a current limit of 1.5 amps. Such voltage and current may be insufficient to power/charge the remote device 116 or might not charge the device as quickly as desired. For example, as illustrated the docking station 118 may be connected to a laptop. The laptop's standard USB port may be capable of receiving around 5 volts at 1.5 amps, but this would be insufficient to charge the laptop. However, the docking station's USB interface with PD can deliver significantly more power.

Thus, the adapter 102 may be configured to separate out power and data from a data interface with PD 112 to provide sufficient power to the remote device 116 on a separate line 106. As illustrated, the adapter 102 may communicate with, as well as receive power from, a docking station 118 via a data interface 112 with PD. Therefore, the adapter 102 may be configured to separate the data interface 112 with PD to provide a data interface 108 and a separate power output 106, which may be coupled to the remote device 116 by a data line 104 and a power line 120. The data interface with PD 110 of the adapter may receive more power than can be provided to the remote device 116 over the second data interface 108. Therefore, the adapter 102 may be configured to separate the power from the data interface 112 with PD for delivery over the dedicated power output 106 to provide more power to the remote device 116 than could be provided by simply connecting the data interface of the remote device 116 the data interface 112 of the docking station 118. In certain embodiments, the data interface 112 with PD may include a PD USB cable includes different conductors. For example, a first set of one or more wires in the cable may be capable of passing the higher power (e.g., a VBus wire and/or a ground wire) and a second set of one or more wires may transmit the data (e.g., a differential pair, one or more super-speed differential pairs, etc.). The power wire (e.g., the VBus wire) and/or a dedicated wire (e.g., a configuration channel (CC) wire) in the cable may be used for negotiating the level of power to be received.

Figure 2:
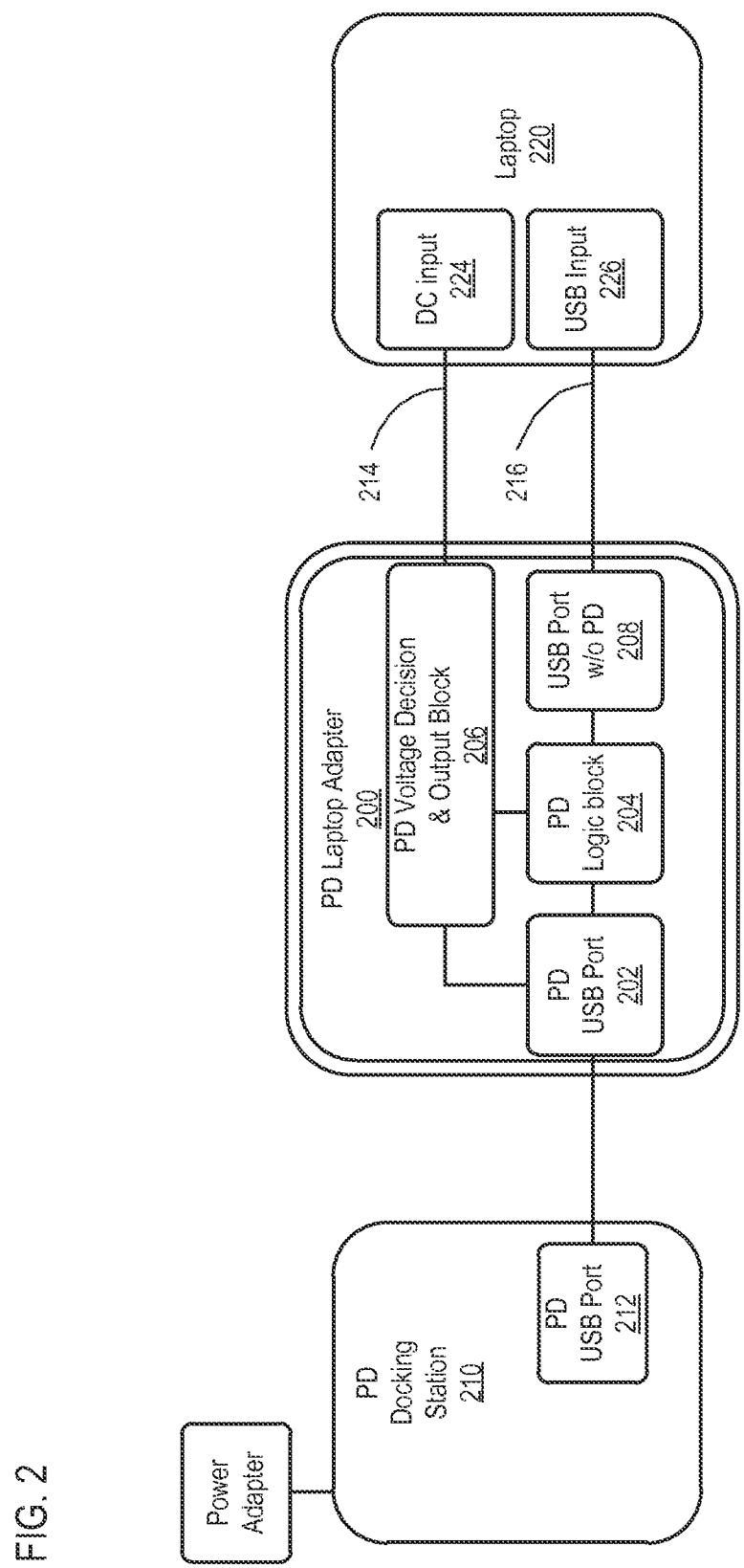
FIG. 2 is a schematic diagram of an adapter separating a docking station's data interface with power delivery, and thereby providing a remote device with a data interface and a discrete power output.

FIG. 2 is a schematic diagram of an adapter 200 separating a data interface with power deliver (e.g. PD USB Port 212) of a docking station 210, thereby providing a remote device (e.g., laptop 220) with a data interface (e.g., USB Input 226) and a distinct power output (e.g., DC input 224). For example, the adapter 200 may separate a PD USB port 202 into a power out line 214 and a standard USB line 216. The adapter 200 may include a data interface with power delivery (e.g., PD USB port 202), a power out line 214, a second data interface without power delivery (e.g., USB port without PD 208), one or more PD voltage decision and output block(s) 206, and one or more PD logic block(s) 204. With these elements, a PD docking station 210 may be adapted to provide a power out line 214 and a data interface without power delivery.

As illustrated, the adapter 200 may receive data and power from a PD docking station 210 by way of a data interface with power delivery (e.g., PD USB port 212). The adapter may receive the data and power by way of a PD USB port 202. The received data may be passed through the PD logic block(s) 204. Also, the docking station 210 may provide a power through the data interface with power delivery (e.g., PD USB port 212). The power may be received by the data interface with power delivery (e.g., PD USB port 202) on the adapter 200 and directed to the PD voltage decision and output block(s) 206. Further, the PD voltage decision and output block(s) 206 may indicate the amount of power available to be supplied to the remote device. For example, the adapter's PD voltage decision and output block(s) 206 may provide the power out line 214 with 19.5 volts and up to 90 watts of power. The PD voltage decision and output block(s) 206 may indicate the amount of power available in a format readable by a laptop configured to read an analog or digital circuit (e.g., a power supply identification (PSID) chip) that indicates the amount of power available. The data and electrical power received by the PD USB port 202 are separated onto the data interface without power output (e.g., USB port 208) and the power out line 214 for distribution to the remote device (e.g., laptop 220). For example, as illustrated, the path from the PD USB port 202 may be separated into a data path to the laptop's USB input 226 and a power path via the PD voltage decision and output block(s) 206 to the laptop's USB input 226.

The data interface with PD 202 may be configured to communicatively couple a remote device to the adapter 200, and, if the remote device is PD enabled, to receive electrical power from the remote device. For example, in certain embodiments, a PD enabled docking station 210 may be connected to the data interface with PD 202 via a PD USB port 212. This PD USB connection may provide both communication data and power to the adapter 200. In certain embodiments, to pass the data and power, the USB line with power delivery connecting the adapter PD USB port 202 to the remote device may include a VBus wire and one or more data wires. In such an embodiment, a first set of wires in the cable may be capable of passing a large amount of power (e.g., the VBus wire) and a second set of wires may transmit the data (e.g., the data wires).

The data received by the adapter 200 from either the remote device (e.g., laptop 220) or the PD docking station 210 may be transparently passed between the data interfaces 202, 208 and through the PD logic block(s) 204. Transparently passing information may refer to passing through all information from one port to another without alteration. For example, an attached laptop may send a signal representing a keystroke to the adapter. This signal may contain more than just the keystroke data. For example, a header may be included within the sent signal. In such an embodiment, the adapter 200 may receive the signal and then pass the signal, including the header, through to an attached docking station.

When a remote device is coupled to the adapter 200, the PD logic block(s) 204 may negotiate with the remote device on a suitable electrical power level to receive from the remote device. For example, when a user connects a docking station 210 to the adapter 200 via a USB port 202, the docking station 210 may send a source capabilities signal to the PD logic block(s) 204 indicating how much power can be provided. In response, the PD logic block(s) 204 may then send a request indicating the amount of power it requires. For example, the PD logic block(s) 204 may know the amount of power needed to charge the laptop 220 and/or to provide the predetermined power output. The power may be specified as a voltage, a current, a power, and/or the like. The PD logic block(s) 204 may indicate the amount of power negotiated to the PD voltage decision and output block(s) 206, which may then provide an appropriate level of power. In some embodiments, the PD voltage decision and output block(s) 206 may decide on a level of power to output based on the negotiations by the PD logic block(s) 204 (e.g., 60 watts, 90 watts, 120 watts, etc.). The PD voltage and decision block(s) 206 may configure an indication of the amount of power available to be provided to the laptop based on the level of output decided (e.g., by adjusting an analog or digital signal output on an power identification line). As illustrated, the PD logic block(s) 204 may couple the data interfaces 202, 204 together as well as being coupled to the PD voltage decision and output block(s) 206. This may allow the PD logic block(s) 204 to utilize the PD USB port 202 to negotiate a level of power to be received with the docking station 210 and to remove such negotiations from communications with the laptop 220. The PD logic block(s) 204 may also be able to control operation of the PD voltage decision and output block(s) 206 based on the negotiations.

FIG. 3 is a flow diagram of a method 300 for separating a data interface with power delivery to create a data interface and a discrete power output. The elements of the method are provided in no particular order and may be rearranged as would be technically feasible.

An adapter may negotiate 302 a power level with the device to supply power. For example, an adapter may be connected with a docking station with a PD USB cable. The PD USB cable may include a VBus line and Data lines that may be separate wires in the cable. The adapter may negotiate the power over the VBus line or a CC wire. The docking station may send a source capabilities message to the adapter advertising the capabilities of the docking station (e.g., the amount of power it can provide). The adapter may send a request message requesting a specific amount of power within the capabilities of the docking station. The docking station may send an accept message to acknowledge the request message. The docking station may finally send a PS_RDY message signaling that the docking station is ready to provide the negotiated power. Then, the docking station may provide the negotiated power to the adapter. The adapter or docking station may additionally communicate with the cable (e.g., with cable plugs) to determine limits on cable capabilities.

The adapter may receive 304 power and data from the device on a same line. For example, an adapter attached to a docking station via a PD USB cable may receive data and power along that same cable. The adapter may separate 306 the power and transmit it using a power interface (e.g., a laptop's power port). The adapter may be configured to provide power to a standardized DC input for the laptop and/or may interface with detachable tips to adapt to the particular laptop being powered. The power coupling may include a line via which the adapter indicates to the laptop the amount of power able to be supplied. The adapter may transmit 308 the received data and a default power level using a data interface. The adapter may transmit and receive data from the docking station and/or the laptop while negotiations are taking place. The adapter may also receive data from the laptop and transmit it to the docking station.

This disclosure has been made with reference to various exemplary embodiments, including the best mode. However, those skilled in the art will recognize that changes and modifications may be made to the exemplary embodiments without departing from the scope of the present disclosure. While the principles of this disclosure have been shown in various embodiments, many modifications of structure, arrangements, proportions, elements, materials, and components may be adapted for a specific environment and/or operating requirements without departing from the principles and scope of this disclosure. These and other changes or modifications are intended to be included within the scope of the present disclosure.

This disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element. The scope of the present invention should, therefore, be determined by the following claims.

What is claimed is:

1. An adapter, comprising:
    a universal non-proprietary data and power interface comprising a single electrical connector and configured to communicatively couple with a single electrical connector of a docking station and configured to receive power provided by the docking station through the single docking connector, the universal non-proprietary data and power interface configured to operate according to a universal data communication standard to enable bi-directional data communication and further configured to operate according to a universal power communication standard;
    a power output comprising a first electrical connector and configured to operably couple to a first electrical connector of a portable electronic device;
    a data interface comprising a second electrical connector separate from the first electrical connector of the power output and configured to communicatively couple with a second electrical connector of the portable electronic device; and
    control circuitry in communication with the universal non-proprietary data and power interface, the power output, and the data interface, the control circuitry configured to:
        relay data communications between the docking station and the portable electronic device through the universal non-proprietary data and power interface and the data interface; and
        provide electrical power to the portable electronic device through the power output, the electrical power derived from the power provided by the docking station;
    wherein the single electrical connector of the universal non-proprietary data and power interface connects the adapter to the docking station and multiple connectors comprising the first electrical connector of the power output and the second electrical connector of the data interface connect the adapter to the portable electronic device.

2. The adapter of claim 1, wherein the control circuitry comprises a power delivery (PD) voltage decision and output block communicatively coupled to the universal non-proprietary data and power interface and configured to convert power from the universal non-proprietary data and power interface to the electrical power.

3. The adapter of claim 2, wherein the PD voltage decision and output block is further configured to detect an amount of power available to be supplied by the docking station communicatively coupled to the universal non-proprietary data and power interface.

4. The adapter of claim 1, wherein the control circuitry comprises a power delivery (PD) logic block communicatively coupled to the data interface and configured to negotiate, through the data interface, with the portable electronic device to determine a proper converted power to provide to the portable electronic device through the power output.

5. The adapter of claim 4, wherein the PD logic block is further configured to receive a source capabilities signal from the docking station through the universal non-proprietary data and power interface, the source capabilities signal indicating an amount of power that can be provided by the docking station.

6. The adapter of claim 1, wherein the control circuitry is further configured to pass the data communications between the docking station and the portable electronic device transparently.

7. The adapter of claim 1, wherein the data interface and the power output are configured to communicatively couple to a second portable electronic device of a different brand than the portable electronic device.

8. The adapter of claim 1, wherein the data interface and the power output are configured to communicatively couple to a second portable electronic device of a different type than the portable electronic device.

9. The adapter of claim 8, wherein the portable electronic device and the second portable electronic device comprise two of a laptop, a tablet, a phablet, and a smartphone.

10. A method of providing a universal non-proprietary data and power interface, the method comprising:
    receiving electrical power and data from a single electrical connector of a docking station at a universal non-proprietary data and power interface comprising a single electrical connector and configured to operate according to a universal power standard and a universal data communication standard to enable bi-directional data communication;
    transmitting power to a first electrical connector of a portable electronic device through a power output comprising a first electrical connector; and
    relaying data between a second electrical connector of the portable electronic device and the docking station through a data interface comprising a second electrical connector separate from the first electrical connector of the power output;
    wherein the single electrical connector of the universal non-proprietary data and power interface connects to the docking station and multiple connectors comprising the first electrical connector of the power output and the second electrical connector of the data interface connect the adapter to the portable electronic device.

11. The method of claim 10, further comprising indicating, through the data interface, an amount of power that is available to be supplied to the portable electronic device through the power output.

12. The method of claim 11, wherein indicating an amount of power that is available to be supplied through the power output comprises indicating the amount of power available using one of an analog circuit and a digital circuit that indicates the amount of power available.

13. The method of claim 12, wherein indicating the amount of power available using one of an analog circuit and a digital circuit comprises indicating the amount of power available with a power supply identification (PSID) chip.

14. The method of claim 10, wherein transmitting power to a portable electronic device comprises:
  receiving a source capabilities signal from the docking station, the source capabilities message indicating an amount of power that can be provided by the docking station;
  transmitting a request message to the docking station, the request message requesting a specific amount of power;
  receiving an accept message acknowledging the request message; and
  receiving a message from the docking station signaling that the docking station is ready to provide the negotiated power.

15. An electrical system, comprising:
  an adapter comprising:
    a universal non-proprietary data and power interface comprising a single electrical connector and configured to receive electrical power from a docking station and enable bi-directional data communication between the docking station and a portable electronic device, the universal data and power interface configured to operate according to a universal data communication standard to enable the bi-directional data communication and further configured to operate according to a universal power communication standard;
    a data interface comprising a first electrical connector and configured to communicatively couple to a first electrical connector of the portable electronic device and transmit and receive data from and to the portable electronic device;
    a power output comprising a second electrical connector separate from the first connector of the data interface and configured to communicatively couple with the portable electronic device; and
    control circuitry comprising:
      a power delivery (PD) logic block communicatively coupled to the data interface and the universal non-proprietary data and power interface, the PD logic block configured to negotiate, with the docking station, a power level of power to receive from the docking station through the universal non-proprietary data and power interface; and
      a PD voltage decision and output block communicatively coupled to the power output, the PD logic block, and the universal non-proprietary data and power interface, the PD power conversion block configured to deliver the electrical power to the portable electronic device through the power output at the power level negotiated by the PD logic block
  wherein the single electrical connector of the universal non-proprietary data and power interface connects to the docking station and multiple connectors comprising the first electrical connector of the data interface and the second electrical connector of the power output connect the adapter to the portable electronic device.

16. The system of claim 15, further comprising the docking station.

17. The system of claim 16, wherein the docking station comprises another universal non-proprietary data and power interface configured to communicatively couple to the universal non-proprietary data and power interface of the adapter and deliver the electrical power to the portable electronic device therethrough, and communicate with the portable electronic device therethrough.

18. The system of claim 15, further comprising the portable electronic device.

19. The system of claim 18, wherein the electronic device comprises a laptop computer.

20. The system of claim 15, wherein the control circuitry is further configured to pass the data communications between the docking station and the portable electronic device transparently.

* * * * *